(12) United States Patent
Newman

(10) Patent No.: US 7,960,000 B2
(45) Date of Patent: Jun. 14, 2011

(54) METHOD AND APPARATUS FOR REMOVING PAINT AND SEALANT

(75) Inventor: Pierce Newman, Live Oak, TX (US)

(73) Assignee: PRC DeSoto International, Inc., Glendale, CA (US)

( * ) Notice: Subject to any disclaimer, the term of this patent is extended or adjusted under 35 U.S.C. 154(b) by 184 days.

(21) Appl. No.: 11/817,545

(22) PCT Filed: Mar. 15, 2006

(86) PCT No.: PCT/US2006/009334
§ 371 (c)(1),
(2), (4) Date: May 2, 2008

(87) PCT Pub. No.: WO2006/099491
PCT Pub. Date: Sep. 21, 2006

(65) Prior Publication Data
US 2009/0007935 A1    Jan. 8, 2009

(51) Int. Cl.
*B32B 9/00* (2006.01)
*B32B 23/02* (2006.01)
*B32B 7/12* (2006.01)

(52) U.S. Cl. ...... 428/40.1; 428/40.2; 428/192; 428/194; 428/343; 428/906

(58) Field of Classification Search ............. 428/40.1, 428/40.2, 40.6, 77, 192, 194, 343, 906; 156/247; 134/4, 38
See application file for complete search history.

(56) References Cited

U.S. PATENT DOCUMENTS

| | | | |
|---|---|---|---|
| 3,149,364 A | | 9/1964 | Baptist |
| 3,580,254 A | * | 5/1971 | Stuart ............... 604/290 |
| 3,950,185 A | * | 4/1976 | Toyama et al. ........ 134/38 |
| 4,858,604 A | * | 8/1989 | Konishi ............... 602/57 |
| 4,899,739 A | * | 2/1990 | Konishi ............... 604/306 |
| 5,102,493 A | | 4/1992 | Bestgen |
| 6,828,008 B2 | * | 12/2004 | Gruber ............... 428/192 |

FOREIGN PATENT DOCUMENTS
EP    0212332 A2 * 3/1987

* cited by examiner

*Primary Examiner* — Patricia L Nordmeyer
(74) *Attorney, Agent, or Firm* — Diane R. Meyers; Lauren E. Schneider

(57) ABSTRACT

A cost-effective and minimally destructive apparatus and method for removing paint and other coatings from a surface. The apparatus comprises a tape having a masking material adapted to adhere to the surface and a stripper, wherein applying the masking material and the stripper can be performed in a single step.

22 Claims, 8 Drawing Sheets

METHOD AND APPARATUS FOR REMOVING PAINT AND SEALANT

FIELD OF THE INVENTION

The present invention relates generally to removal of paints and sealants and more particularly to non-destructive and efficient apparatuses and methods for such removal.

BACKGROUND

Several methods are known for removing paint and generally such methods can be divided into three categories: mechanical, thermal and chemical.

Mechanical abrading processes are known in the art. Scraping is usually accomplished with either a putty knife or a paint scraper, or both. Putty knives range in width from one to six inches and have a beveled edge. A putty knife is used in a pushing motion going under the paint and working from an area of loose paint toward the edge where the paint is still firmly adhered. Paint scrapers are commonly available in 1 5/16, 2 1/2, and 3 1/2 inch widths and have replaceable blades. In addition, profiled scrapers can be made specifically for a particular purpose. A paint scraper is used in a pulling motion and works by raking the damaged areas of paint away. Scrapers may be formed from steel, aluminum, wood, Mycarta, and nylon, the desired choice being a softer material than the substrate being scraped to avoid marring for appearance or structural reasons.

Both the putty knife and paint scraper, particularly the paint scraper with its hooked edge, must be used with care to avoid "scribe scratches." For example, when using metal scrapers to remove paint and sealant from aircraft skin, scribe scratching has been recognized as a significant problem, causing hairline cracks and fissures that can ultimately grow into larger cracks and threaten the structural integrity of the aircraft. The preferred methods for using scrapers on aircraft are discussed in the Aircraft Structural Repair Manuals (SRM) or FAA Advisory Circulars, AC 65-16A and AC 43.205. The following government documents document and discuss solutions to the issues of fatigue cracks subsequent to scribe mark scratches: The Federal Aviation Bulletin, FSAW 03-10B (amended), dated Mar. 31, 2004 "Fuselage Skin 'Scribe Mark' Damage on a Boeing 737 Aircraft; The Transport Canada Airworthiness Notice B071, Edition 1-3 Nov. 2004, "Paint and Sealant Removal Process."

Other mechanical methods to remove paint include sanding, sandblasting, water blasting, plastic media blasting, and the like. All of these methods are characterized by modifying the surface being worked through surface abrasion, and in addition, they tend to be slow and labor intensive.

It is also known to use thermal methods, such as an electric heat plate and electric heat gun. Thermal methods have limited applications.

Finally, paint can be removed chemically. Solvent-base strippers have formulas that generally contain combinations of organic solvents such as methylene chloride, isopropanol, toluol, xylol, and methanol. Thickeners such as methyl cellulose and various additives such as paraffin wax are added to prevent the volatile solvents from evaporating before they have time to soak through multiple layers of paint. Some solvent-base strippers are quite thin and therefore unsuitable for use on vertical surfaces while others, called "semi-paste" strippers, are formulated for use on vertical surfaces or the underside of horizontal surfaces. More recently, paint removers have been formulated using a mixture of water and benzyl alcohol.

Chemical Paint Removers have several problems in their use. Paint removers, especially older formulations containing methylene chloride, are subject to extensive health and environmental restrictions. Since they are sprayed on the surface and allowed to work, applicator personnel must wear complete personal protective equipment while using the materials and the Volatile Organic Component (VOC) of the sprayed material is closely monitored in the U.S. Clean Air Act. Finally, at the conclusion of the stripping operation using chemicals, significant amounts of liquid/solid waste are generated and must be safely disposed.

A paint removal system that addresses some of the above-noted problems is desirable.

SUMMARY OF THE INVENTION

The present invention provides a cost-effective and minimally destructive apparatus and method for removing paint and other coatings from a surface.

In one form thereof, the present invention provides an apparatus for removing a substance from a surface. The apparatus comprises a tape having a masking material adapted to adhere to the surface and a stripper, wherein applying the masking material and the stripper can be performed in a single step.

In a preferred embodiment, the apparatus comprises a matrix impregnated with the stripper and a bladder in which the stripper is impregnated. The matrix and bladder are disposed centrally with respect to a lengthwise axis of the tape and the masking material is disposed on lateral sides of the tape. A backing material is removably adhered to the tape.

In another preferred embodiment, the apparatus comprises an elongated tape having the masking material disposed along lateral sides thereof and the stripper disposed between the masking material. The tape is wound on a roll and includes a removable backing.

In another form thereof, the present invention provides a method of removing a substance from a surface. The method comprises masking a portion of the surface with masking material to protect it from a stripper and applying the stripper to an unmasked portion of the surface. These steps are performed at substantially the same time.

One advantage of the present invention is that it saves time. The stripper and masking material can be applied at the same time, in a single step, as opposed to two separate steps. Use of this invention allows airplane operators to perform the removal step within their maintenance hangers during other routine checks, rather than requiring the aircraft to be dispatched to a specialized facility for removal of paint and sealant. The invention is envisioned as being supplied to the user as a complete kit required for whatever model of aircraft is being examined for scribe marks. Current practice is to mask the aircraft as though it were being completely stripped of paint and sealant. This invention can eliminate that labor intensive step in the process.

Another advantage of the present invention is that it allows less stripper to be used because the stripper material, which is typically volatile, is covered, which greatly reduces evaporation. Less stripper is used, saving material costs and also reducing the amount of waste and thus reducing disposal costs. Efficiency of the stripper improves, since the solvent that penetrates the paint is being held next to the surface in the channel, rather than evaporating into the atmosphere. In addition to increased efficiency, the reduction in evaporation will mean less contribution from the stripper to total VOC output of the facility, thereby providing considerable pollution prevention advantages.

From a similar pollution prevention perspective, the present invention will significantly reduce the "cleanup" phase of the stripping operation, where considerable amounts of solvent and contaminated water waste are generated. Since the paint and sealant adhere to the fiberglass mesh matrix at the conclusion of stripping, all of the contributors to pollution, viz., stripper, paint and sealant, will be confined to one item that may be disposed of accordingly.

Another advantage of the present invention is that, since only the stripper and mesh pad are in contact with the surface being examined, no adhesive residues are left that might interfere with the inspection process

BRIEF DESCRIPTION OF DRAWINGS

The above-mentioned and other advantages of the present invention, and the manner of obtaining them, will become more apparent and the invention itself will be better understood by reference to the following description of the embodiments of the invention taken in conjunction with the accompanying drawings, wherein:

FIG. 6 is a sectional view of an alternate embodiment of the present invention, and.

Corresponding reference characters indicate corresponding parts throughout the several views.

DETAILED DESCRIPTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

Figure 1:
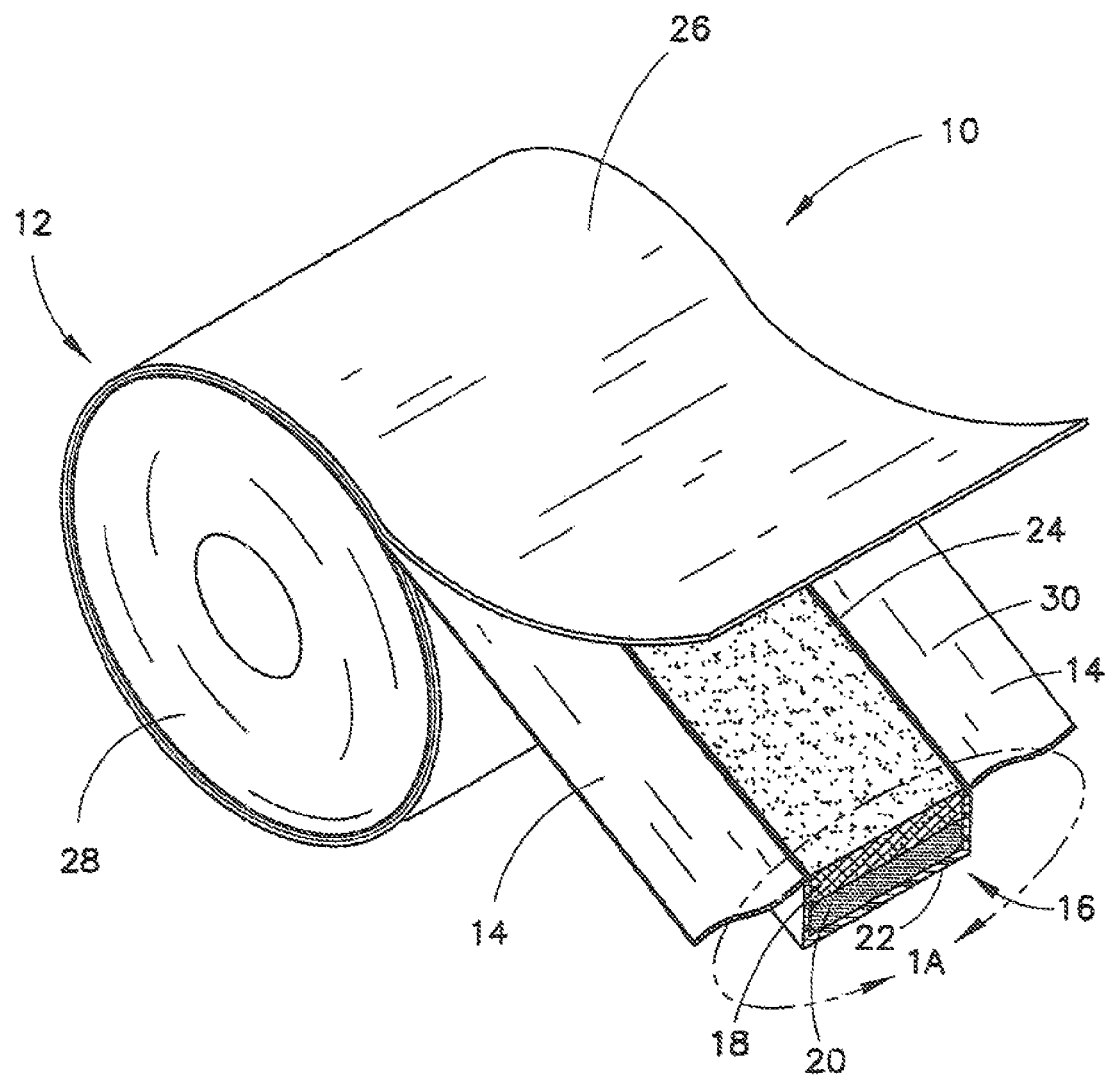
FIG. 1 is a perspective view in partial cross-section of a substance removal apparatus embodiment of the present invention.
Figure 1A:
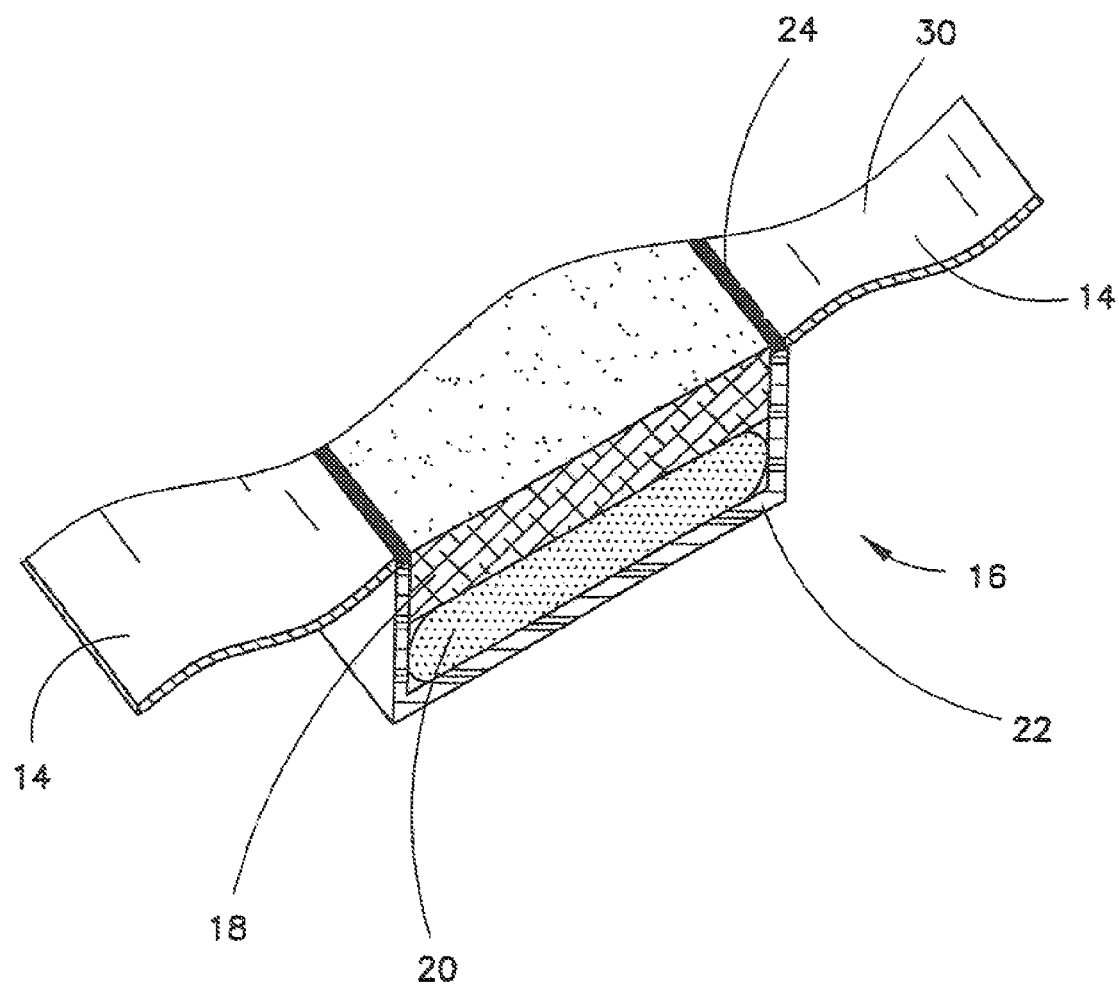
FIG. 1A is an enlarged perspective view of the portion of the apparatus indicated in FIG. 1.

Referring now to FIGS. 1 and 1A, apparatus 10 for removing a substance from a surface is provided as a tape 12 having masking material provided as strips 14. A stripper segment or matrix 16 is provided in the center of tape 12, between strips 14. Stripper segment 16 further includes a fibrous material layer 18. Adjacent to and in contact with fibrous layer 18 is bladder 20, which in the illustrated embodiment includes a liquid stripper that, during use of apparatus 10 as explained below, will impregnate or saturate fiber layer 18 with a liquid chemical stripper (not shown). Bladder 20 is preferably configured to rupture upon the application of a force to it such that the liquid therein saturates layer 18, as explained below. Neoprene is one suitable material for bladder 20. A rectangular shell 22 forms a channel and houses therein layer 18, and bladder 20. Shell 22 is preferably made of a quasi-rigid material such as Mylar®. Optional beads 24 join masking material 14 to shell 22. The beads 24 may be made of rubber or other suitable polymer. A removable backing 26 covers tape 12 as shown. Tape 12 is wound on a roll 28.

With reference to FIG. 1A, masking material 14 is preferably provided as a conventional masking tape having an adhesive 30 applied on one side thereof. One tape suitable for use with apparatus 10 is an aluminum adhesive tape meeting MIL-T-23397B, one (1) inch wide, available from 3M Corporation, Grade 417 Aluminum Foil Tape, 900 Bush Avenue, St Paul Minn., 55133. The adhesive provided on the tape should sufficiently adhere to the surface being stripped such that it forms a liquid-proof seal with the surface, thereby rendering bead 24 optional. In embodiments where bead 24 is employed, masking material 14 is attached thereto by means of heat welding, sonic welding, adhesives or other suitable fastening means.

Shell 22 is also joined to bead 24 by any of a variety of suitable fastening means. As alluded above, shell 22 is relatively rigid for the reasons described below. A suitable material for shell 22 meets MIL-P-22270 and is available from Dupont Discovery Films, 1 Discovery Drive, Hopewell Va., 23860. The approximate desired thickness for shell 22 is 10 mils. An alternative packaging material is an oxygen barrier bagging material, commonly known as "mylar" bags and consisting of a mylar/aluminum sandwich. For improved puncture resistance, nylon may be substituted for polyester. These products are manufactured by and available from IMPAK corporation, 2460 East 57$^{th}$ St, Los Angeles, Calif. 90058.

Also, while shown as rectangular in the illustrated embodiment, shell 22 may have a curved or rounded profile. Shell 22 is preferably non-porous such that the stripper liquid contained therein cannot escape by leakage or evaporation.

The bladder 20 can be a tube or oval shape for easy fitting into the shell. The tubes containing the stripper are filled using standard liquid filling techniques and are placed in the semi-rigid matrix or shell 22. Preferably, the bladder will have the same cross-sectional dimensions as the shell and will fit snugly into shell 22. Once inserted into the shell, the fibrous matrix 18 for absorbing the stripper is fitted into the shell and glued to the shell with a chemically resistant epoxy adhesive. Tygon® extruded tubing is suitable for bladder 20 and is available from Prince Rubber and Plastics, 137 Arthur Street, Buffalo N.Y. 14207.

The liquid which fills bladder 20 can be any of a variety of commercially available strippers, depending upon the particular paint, sealant or coating that is to be removed with the stripper. For removing coatings on commercial aircraft, the stripper should be capable of removing both a polyurethane topcoat, epoxy primer and common polysulfide sealants, such as sealants meeting MIL-S-8802. One such stripper is Eldorado Solutions, PR-3133, Eldorado Solutions, Carmel Ind.

Fibrous materials suitable for layer 18 can be any material that is inert to the stripper and that tends to spread the stripper material evenly over the surface contacted upon contact. The term "inert" is intended to mean that the fibrous material does not substantially chemically react with the stripper composition and is capable of maintaining mechanical integrity for a period at least as long as the shelf life of apparatus 10. Examples of suitable materials for fibrous layer 18 include polymers, such as polypropylene and polyethylene; woven and non-woven fabrics, such as felts, cotton and wool; and glass fibers such as fiberglass. One of skill in the art would readily recognized many materials that would perform suitably for fibrous layer 18.

Backing 26 may be polyvinyl chloride (PVC), nylon, paper with a metallized interior to prevent chemical migration, mylar with aluminized backing, or any other material having the following characteristics: ability to form into a channel for insertion of bladder and fibrous matrix; rigid, yet deformable that can be crushed with a nylon hand scrapper; chemically resistant to migration of the stripper for sufficient time (e.g., less than 24 hours); and compatible with the other materials used for apparatus 10, such as the adhesive on the aluminum tape. One such preferred material is an extruded PVC backing. The ready availability of these extrusions and the ability to form complex internal geometry for the bladder and matrix to fit into it make it a desirable alternative. One such manufacturer for backing 26 is Fukuvi USA, 7631 Progress Court, Huber Heights, Ohio 45242.

Figure 2:
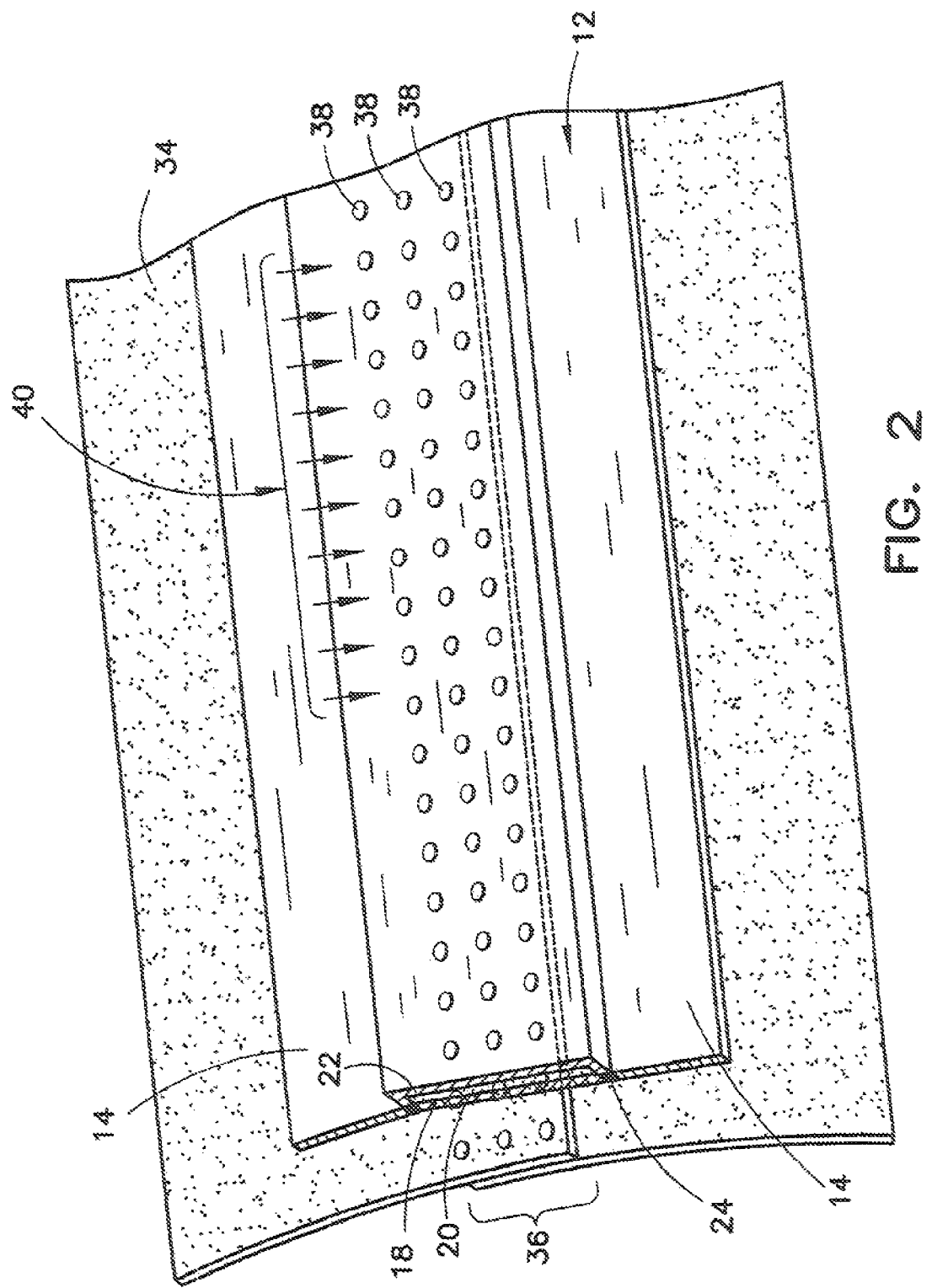
FIG. 2 is a fragmentary perspective view of the apparatus of FIG. 1 applied to a lap joint.

With reference now to FIG. 2, in use, tape 12 is applied to a surface such as aircraft skin 34, particularly, over lap joint 36. Most aircraft have many lap joints such as joint 36 having rivets 38 securing the joints. Sealant as well as paint is typically applied to the joints. To check the integrity of the lap joints years or even decades after the plane is manufactured, the paint and sealant must first be stripped from the joints. As alluded above, however, metal scrapers that are commonly used tend to gouge or "score" the aircraft skin, which may ultimately cause larger cracks.

Tape 12 is centered over the lap joint desired to be stripped and then applied to the skin 34 in the same manner as a conventional piece of tape. After the tape is applied, pressure is applied as indicated by arrows 40 to shell 22, which ruptures the bladder, which in turn causes the liquid stripper to saturate the fibrous layer 18. The fibrous layer then meters the stripper fluid, i.e., spreads it evenly over the surface of the skin desired to be stripped. Beads 24 prevent the stripper fluid from spreading laterally and thus define a border or periphery beyond which the stripper does not reach.

After the requisite time has elapsed, tape 12 is removed from aircraft skin 34. Ideally, the stripper has caused the paint and sealant to delaminate from the aircraft skin and stick to fibrous layer 18, but otherwise remain intact. In such event, the paint and sealant are removed as a single layer along with tape 12. In many cases, however, this will not be possible, in which event manual wiping and perhaps some light scraping after removal of tape 12 is required to remove the residual paint and/or sealant. In any event, one of skill in the art can now readily appreciate that the masking material and stripper are applied at substantially the same time, in a single step.

Figure 3:
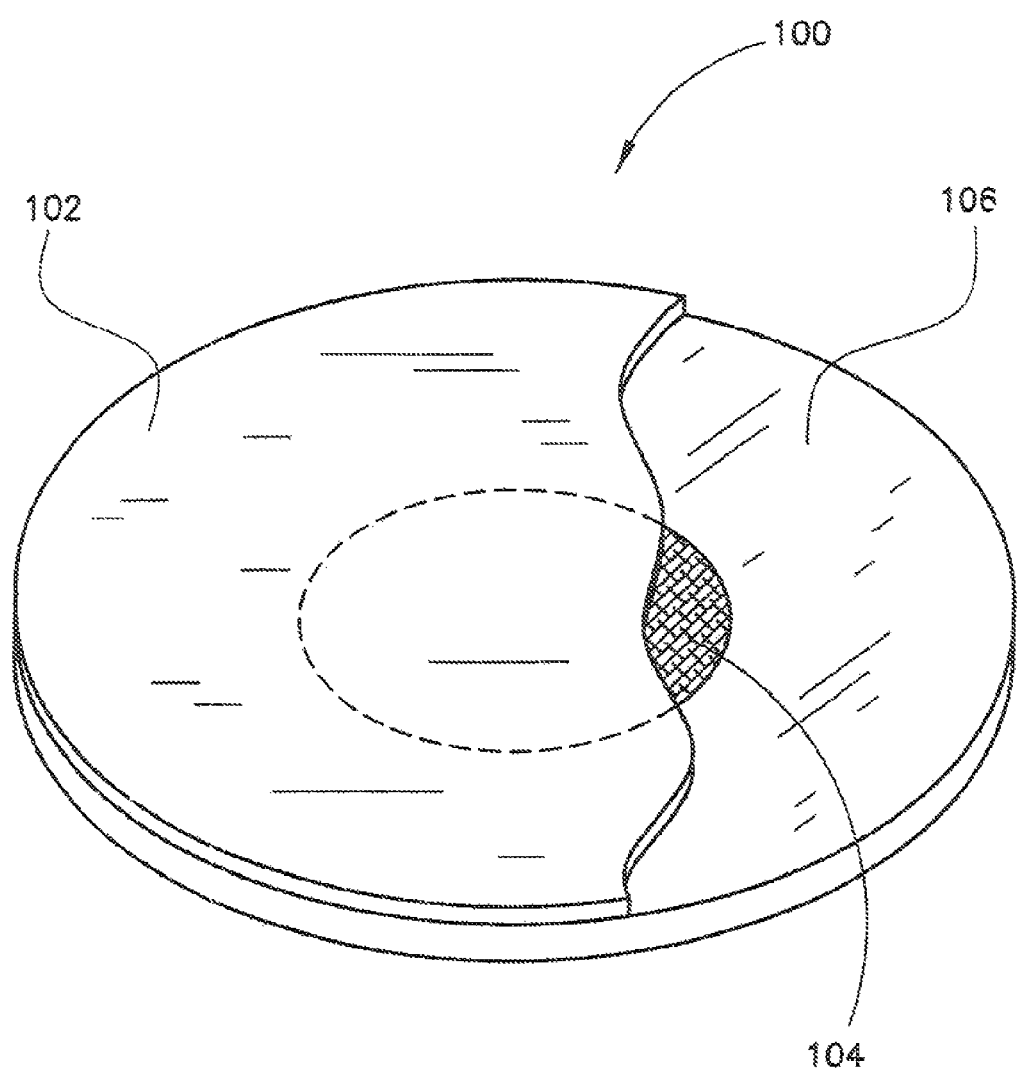
FIG. 3 is a perspective view partially broken away of an alternate embodiment of the present invention.

Turning now to FIG. 3, an alternate embodiment of apparatus 100 is shown having a backing 102, a circular fibrous layer 104, and a masking material 106 surrounding the fibrous layer. Apparatus 100 can be used for stripping spots of a surface at desired locations. Apparatus 100 is simply applied to the spot desired to be stripped in a manner similar to that described above with reference to apparatus 10.

Figure 4:
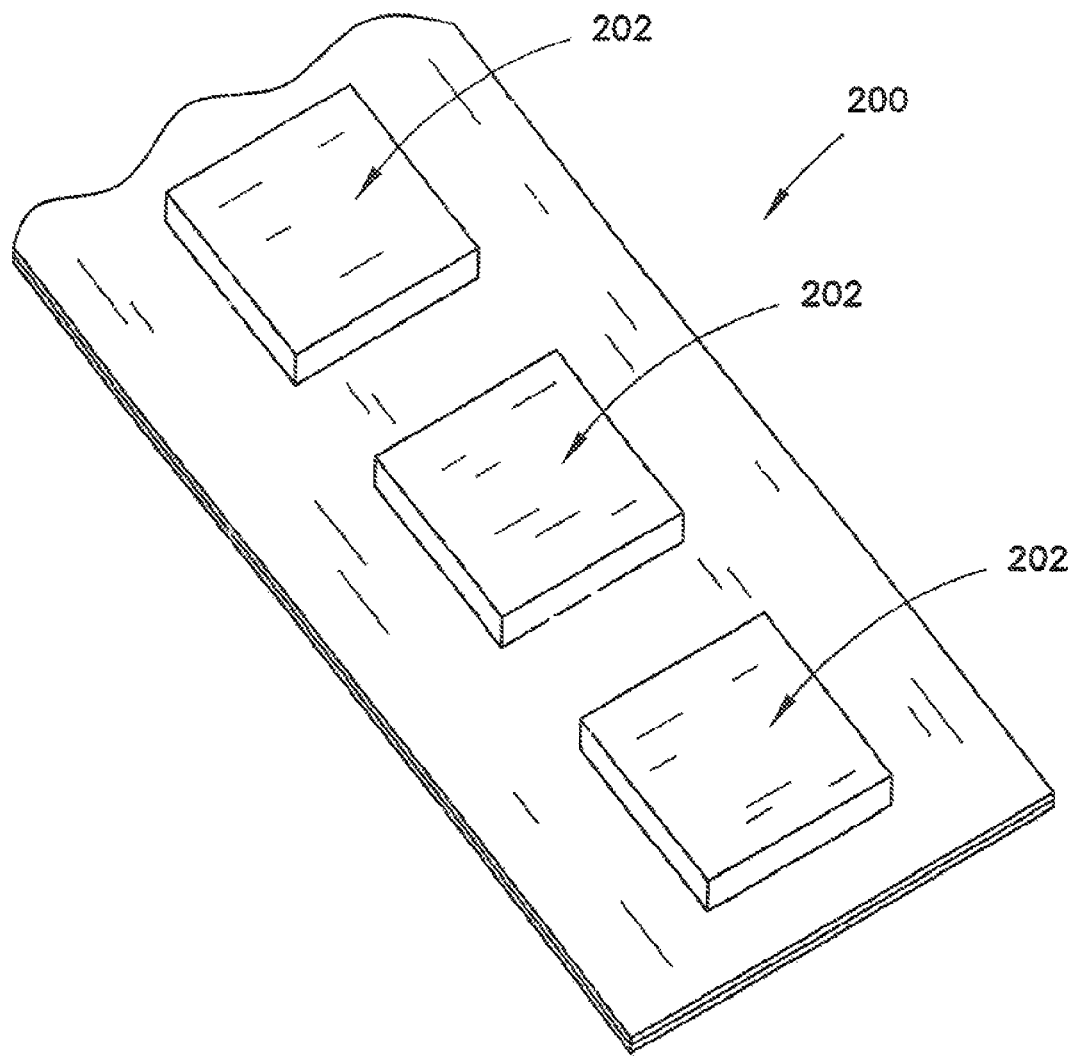
FIG. 4 is a fragmentary perspective view of an alternate embodiment of the present invention.

FIG. 4 illustrates another embodiment in which apparatus 200 includes stripping areas 202 that are evenly spaced for use in applications where the areas desired to be stripped are also evenly spaced. The underside of apparatus 200 (not shown) includes a liquid stripper material that is preferably contained in a bladder and/or fibrous material, and also includes a removable backing layer as described above.

Figure 5:
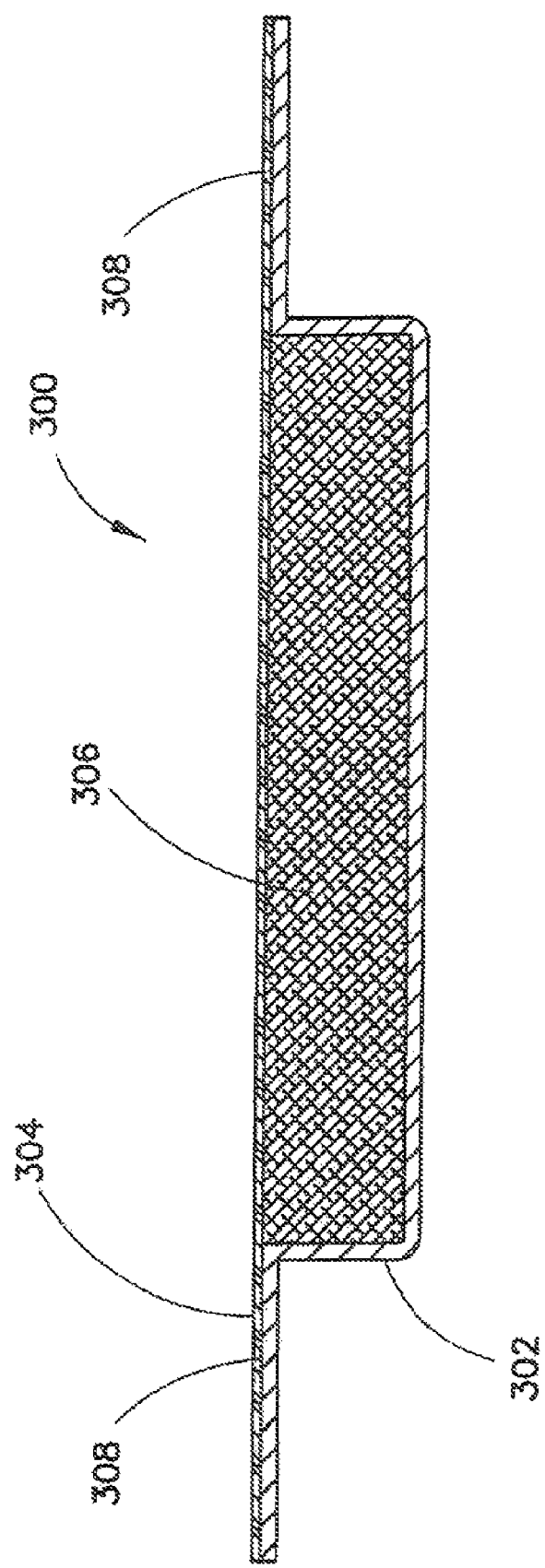
FIG. 5 is a sectional view of an alternate embodiment of the present invention.

In FIG. 5, an embodiment is shown in which apparatus 300 includes a tape 302, a backing material 304 and a liquid stripper-impregnated fibrous matrix 306 sandwiched therebetween. The optional bladder is not provided in this embodiment. Instead, the backing material 304 and tape 302 form a liquid impervious seal 308 which maintains the stripper material within fibrous matrix 306 until the backing material is removed and apparatus 300 is applied to a surface desired to be stripped.

Figure 6:
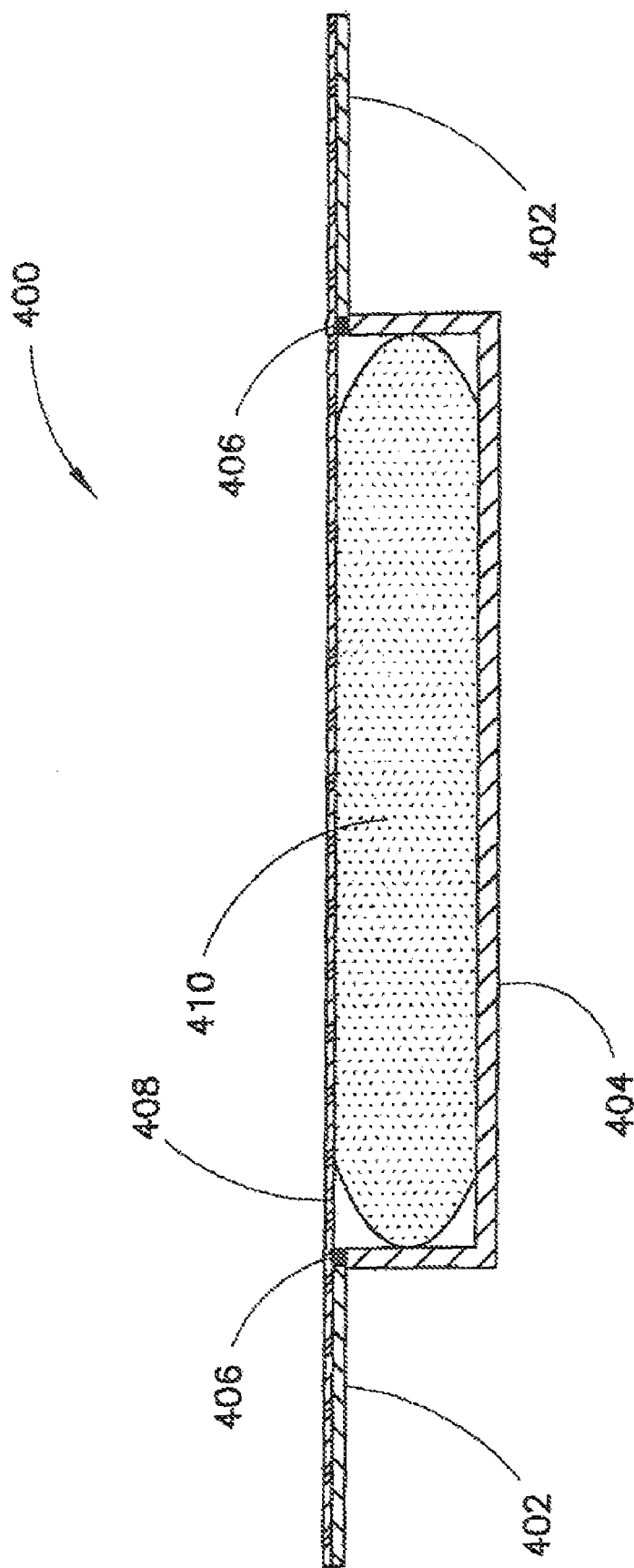

FIG. 6 illustrates an embodiment in which apparatus 400 includes a tape 402 and a shell 404, both of which are joined to beads 406. A backing material 408 is hermetically sealed to tape 402. A bladder 410 is housed in shell 404 and contains the liquid stripper. Apparatus 400 is applied in the same fashion as apparatus 10, except there is no fibrous matrix provided in apparatus 400. Beads 406 help prevent liquid stripper from spreading laterally outside of the area intended to be stripped.

Figure 7:
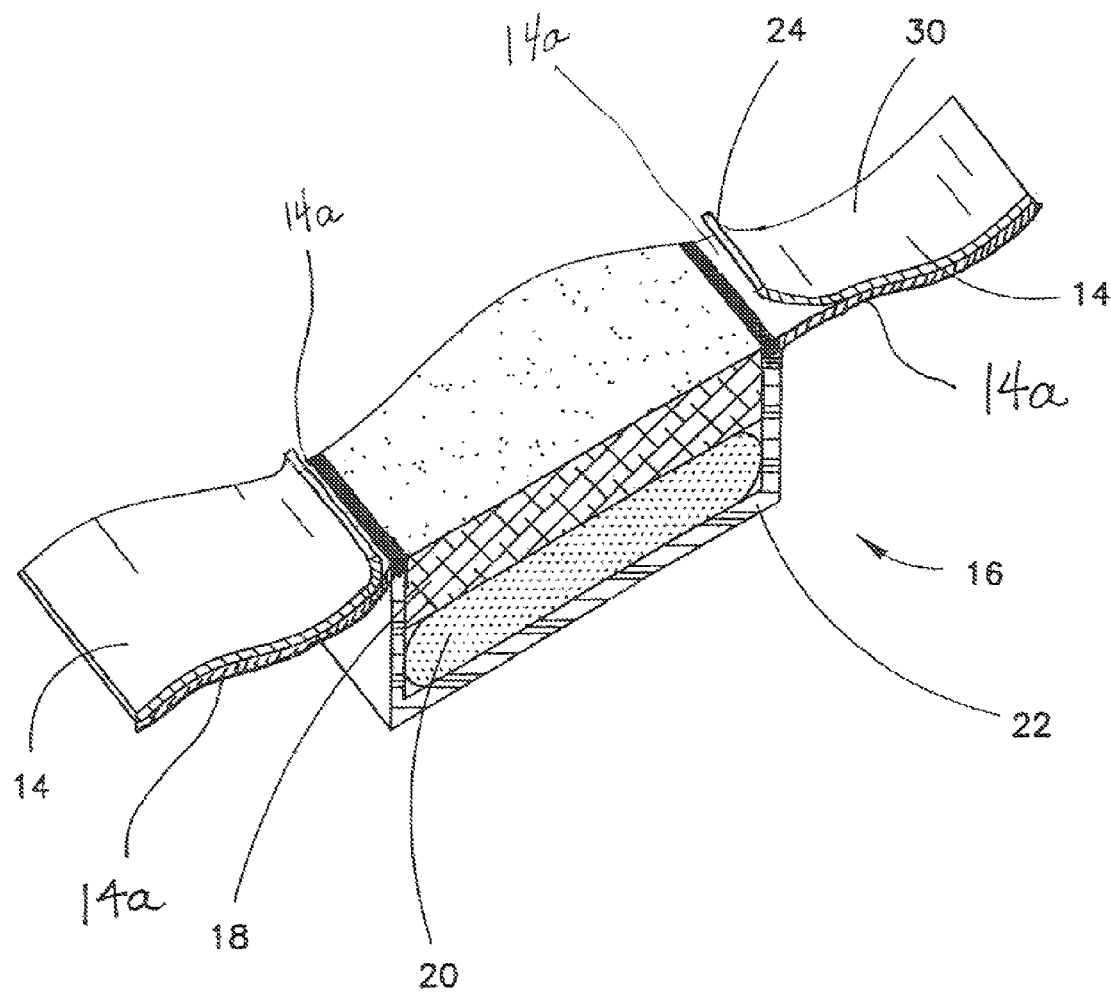
FIG. 7 is an enlarged perspective fragmented view in partial cross-section of another embodiment in accordance with the present invention.

In another embodiment shown in FIG. 7, the apparatus comprises a fiberglass mat 18 adjacent to a Tygon® bladder 20 filled with stripper. Bladder 20 in turn is surrounded by a PVC channel or shell 22 which has been secured to aluminum tape 14 flanking the channel with another layer of tape 14a. That is, unlike the embodiment in FIG. 1 that has a single tape 14, this embodiment includes two tape layers 14, 14a laminated together. The contents of the PVC channel 22 are protected from weather by a removable paper backing (not shown). The adhesive pull strength of the upper layer of tape 14a is about one half of the tape 14 adhering to the desired surface, thus allowing the operator to remove the channel 22, stripper bladder 20 and mesh matrix 18 while leaving the outer tape masking 14 adhered to the surface. Since chemical removal of paint and sealant may not be complete, this embodiment allows the user to do minor "touchup" work prior to removing layer 14 and performing the inspections noted above.

While a preferred embodiment incorporating the principles of the present invention has been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An apparatus for removing a substance from a surface, comprising a tape having a masking material adapted to adhere to the surface, a matrix comprising a shell containing a stripper, and at least one bead between and joining the masking material and the matrix, wherein applying the masking material and the matrix containing the stripper can be performed in a single step.

2. The apparatus of claim 1, wherein the matrix further comprises a bladder in which the stripper is contained.

3. The apparatus of claim 1, wherein the matrix further comprises a bladder containing the stripper within the shell and a fiber layer, the matrix being disposed centrally with respect to a lengthwise axis of the tape and the masking material being disposed on lateral sides of the tape.

4. The apparatus of claim 1, wherein the tape comprises a backing material removably attached thereto.

5. The apparatus of claim 1, wherein the at least one bead comprises a plurality of beads that joins the matrix containing the stripper to the masking material, defines a periphery of application for the stripper, and prevents the stripper from spreading past the periphery.

6. The apparatus of claim 1, wherein the masking material comprises an adhesive.

7. The apparatus of claim 1, wherein the tape is elongated, the masking material is disposed along lateral sides thereof, and the matrix containing the stripper is disposed between the masking material.

8. The apparatus of claim 7, wherein the tape is wound on a roll.

9. The apparatus of claim 7, further comprising a removable backing disposed on a side of the tape.

10. The apparatus of claim 1, wherein the masking material comprises two masking layers removably adhered together.

11. The apparatus of claim 1, wherein the matrix further comprises a fiber layer impregnated with a stripper.

12. An apparatus for removing a substance from a substrate, comprising a tape having:
   a masking material adapted to adhere to the substrate; and
   a matrix containing a stripper, the matrix comprising a fiber layer having first and second surfaces and a shell containing the stripper, the shell extending from the first surface of the fiber layer, wherein the second surface of the fiber layer is configured to contact the substrate,
   wherein applying the masking material and the matrix containing the stripper can be performed in a single step.

13. The apparatus of claim 12, wherein upon application of the apparatus to the substrate and release of the stripper from the shell to the fiber layer, the stripper saturates the first surface of the fiber layer and migrates to the second surface of the fiber layer and onto the substrate.

14. The apparatus of claim 12, wherein the matrix further comprises a bladder for containing the stripper within the shell.

15. A method of removing a substance from a surface comprising:
   (a) masking a portion of the surface with masking material to protect it from a stripper; and
   (b) applying the stripper contained within a shell joined to the masking material by at least one bead to an unmasked portion of the surface; wherein steps (a) and (b) are performed at substantially the same time.

16. The method of claim 15, further comprising removing the masking material and at least a portion of the substance therewith.

17. The method of claim 15, wherein the masking material and the shell containing the stripper are both provided in a roll.

18. The method of claim 17, wherein the roll comprises an elongated tape having the masking material disposed along lateral sides thereof, the shell containing the stripper disposed between the masking material, and the at least one bead disposed between the shell containing the stripper and the masking material.

19. The method of claim 17, wherein the roll further comprises a removable backing.

20. The method of claim 15, wherein the masking material comprises two masking layers removably adhered together, the method further comprising, after step (b), removing one of the masking layers while leaving the other adhered to the surface.

21. The method of claim 15, wherein the surface comprises an aircraft surface.

22. The method of claim 21, wherein the surface comprises a lap joint.

* * * * *